(12) United States Patent
Lee et al.

(10) Patent No.: US 7,394,776 B2
(45) Date of Patent: Jul. 1, 2008

(54) NETWORK SYSTEM FOR ESTABLISHING PATH USING REDUNDANCY DEGREE AND METHOD THEREOF

(75) Inventors: Ji-hoon Lee, Cheongju-si (KR); Jung-ho Kim, Suwon-si (KR); Sun-shin An, Seoul (KR); Won-jong Noh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 502 days.

(21) Appl. No.: 11/035,895

(22) Filed: Jan. 18, 2005

(65) Prior Publication Data

US 2005/0157697 A1 Jul. 21, 2005

(30) Foreign Application Priority Data

Jan. 20, 2004 (KR) ................ 10-2004-0004198

(51) Int. Cl.
*H04B 7/00* (2006.01)
*H04J 3/24* (2006.01)
*H04L 12/28* (2006.01)
*H04L 12/56* (2006.01)

(52) U.S. Cl. ............... 370/310; 370/235; 370/238; 370/349; 370/351; 370/389; 370/392; 370/400

(58) Field of Classification Search .......... 370/235, 370/238, 310, 349, 351, 389, 392, 400
See application file for complete search history.

(56) References Cited

U.S. PATENT DOCUMENTS 6,480,497 B1 * 11/2002 Flammer et al. ............ 370/400
6,788,670 B1 * 9/2004 Larsson ..................... 370/351
6,888,831 B1 * 5/2005 Hospodor et al. ........... 370/394
6,954,435 B2 * 10/2005 Billhartz et al. ............ 370/252
2003/0161311 A1 * 8/2003 Hiironniemi ............... 370/392
2004/0258064 A1 * 12/2004 Nakamura et al. .......... 370/389
2006/0002368 A1 * 1/2006 Budampati et al. ......... 370/351
2006/0146717 A1 * 7/2006 Conner et al. .............. 370/238

OTHER PUBLICATIONS

"Node Synchronization Based Redundant Routing for Mobile Ad-Hoc Networks." Wonjong Noh, Yunkuk Kim and Sunshin An. Lecture Notes in Computer Science. Wireless On-Demand Network Systems. Available Friday Dec. 19, 2003.*
Sangkyung Kim, Wonjong Noh, Sunshin An. "Multi-path Ad Hoc Routing Considering Path Redundancy". Jun. 30-Jul. 2003. ISCC 2003: 45-50.*

* cited by examiner

*Primary Examiner*—Lester Kincaid
*Assistant Examiner*—Nathan Mitchell
(74) *Attorney, Agent, or Firm*—Staas & Halsey LLP

(57) ABSTRACT

A method for establishing a path between nodes in a wireless network system. A source node broadcasts a route request (RREQ) packet for a destination node. A mobile node between the source node and the destination node, upon receiving the RREQ packet, appends a redundancy degree with respect to an adjacent node to the RREQ packet and broadcasts the RREQ packet. The destination node selects an optimal path by checking the redundancy degree received along each path when the RREQ packet is received along multiple paths, and the destination node establishes an optimal path to the source node by transmitting a route reply (RREP) packet along the optimal path. Accordingly, the path is established suitable for the quality of service of data to be transmitted and a lost path is promptly recoverable by reference to information stored at each mobile node identifying redundant paths available to the mobile node.

31 Claims, 8 Drawing Sheets

NETWORK SYSTEM FOR ESTABLISHING PATH USING REDUNDANCY DEGREE AND METHOD THEREOF

CROSS-REFERENCE TO RELATED APPLICATIONS

This application claims the benefit of Korean Patent Application No. 2004-4198 filed on Jan. 20, 2004 in the Korean Intellectual Property Office, the disclosure of which is incorporated herein by reference.

BACKGROUND OF THE INVENTION

1. Field of the Invention

The present invention concerns a path establishing method in a wireless network environment and a wireless network device therefor. Particularly, the present invention concerns a wireless network device for establishing an optimal path by calculating and using information on a redundant path and recovering a lost path by using the redundant path and a method thereof.

2. Description of the Related Art

Development of Internet and wireless communication technologies has contributed to delivery of diverse multimedia services beyond time and location, to thus give rise to significant changes to life environment of users. Recently, as compact handheld electronic devices, such as a notebook computer and a personal digital assistant (PDA), have come into wide use, more efforts are made toward implementation of Internet-based data communication in a wireless network as well as in a wired network.

A representative of the wireless network is an ad-hoc network. The ad-hoc network has no integrated central management device, does not use existing communication infrastructure, and has no fixed controller (such as a router, a host, and a radio base station) for connecting mobile nodes. A mobile node serves as a router in the ad-hoc network. If a certain mobile node intends to communicate with a correspondent node, the certain node needs to establish a communication path via several nodes located between the certain node and the correspondent node.

For example, such an ad-hoc network may be a sensor network including a plurality of sensors. Progress of wireless communication enables development of a sensor node with low cost, low power, and multifunction. Operations such as sensing, data processing, and communicating, can be performed by implementing a sensor network including such compact sensor nodes. The sensor network includes a plurality of the sensor nodes, densely distributed. Implementation of a routing protocol is required among the sensor nodes having only an air interface to collect and deliver required information using the sensor nodes. It is required to suitably deal with situations due to free movement of the sensor nodes.

FIG. 1 illustrates a path establishment in a conventional wireless network including the plurality of the mobile nodes. Referring to FIG. 1, when a source node N1 of the mobile nodes intends to transfer information to a destination node N11, the information may be transferred via the other nodes located between the source node N1 and the destination node N11 when it is impossible to deliver the information directly from the source node N1 to the destination node N11. That is, the information may be transferred along a path established via the other nodes. The path is established by switching a route request (RREQ) packet and a route reply (RREP) packet. Concretely, if the source node N1 transmits a RREQ packet to adjacent nodes N2 and N3, the nodes N2 and N3 register the source node N1, which transmits the RREQ packet as an upstream node, and transmits the received RREQ packet to adjacent nodes N4 and N6. The RREQ packet contains an ID of the destination node N11. Each intermediate node receiving RREQ packets determines whether the receiving node is the destination node N11. If the receiving node is not the destination node, the intermediate node forwards the RREQ packet to a next hop node, or if the receiving node is the destination node, the intermediate node selects an optimal path by checking information on the intermediate nodes contained in the received RREQ packet and forwards a RREQ packet in an inverse direction of the RREQ packet transmission. In the conventional arrangement, a shortest path, namely a path having a smallest number of the intermediate nodes is selected as the optimal path for the swift information delivery. That is, the destination node N11 transmits the RREP packet toward an upstream router transmitting the RREQ packet via the smallest number of the intermediate nodes. When the source node N1 receives the RREP packet, the path is established between the source node N1 and the destination node N11.

However, the conventional arrangement has a disadvantage that quality of service (QoS) is not provided selectively depending on characteristics of data to be transferred. The selected optimal path is advantageous for the swift information delivery, but is not suitable for data requiring stable delivery rather than the swift delivery.

Referring again to FIG. 1, if the node N4 has a failure, or, if the established path is lost due to the node movement to other directions, a new path has to be established between the source node N1 and the destination node N11, thus requiring more time for path recovery and node rediscovery.

SUMMARY OF THE INVENTION

To address the above disadvantages and problems of the conventional arrangement, an aspect of the present invention provides a wireless network device located between a source node and a destination node for calculating and storing a redundancy degree so as to promptly recover a lost path between the source node and the destination node using a redundant path and a method thereof.

To accomplish the above aspect of the present invention, the method for establishing a path between nodes in a wireless network system comprising a source node and a destination node receiving a message from the source node is provided. The method comprises broadcasting a route request (RREQ) packet from the source node for the destination node, receiving the RREQ packet at one or a plurality of mobile nodes between the source node and the destination node, appending a redundancy degree with respect to an adjacent node to the RREQ packet and broadcasting the RREQ packet from each mobile node for the destination node, selecting an optimal path at the destination node based on the redundancy degree contained in the RREQ packet received along each path, and establishing a reply route to the source node by transmitting a route reply (RREP) packet along the optimal path.

The calculating of the redundancy degree at each mobile node with respect to the adjacent node comprises checking a temporal association, a spatial association, and a mobility with respect to the adjacent node.

The receiving of the RREQ packet at each mobile node comprises determining a redundant reception of the RREQ packet by the mobile node receiving the RREQ packet, registering the adjacent node transmitting the RREQ packet as an upstream node when the RREQ packet is not received redundantly, and appending to the RREQ packet the calculated redundancy degree in relation to the upstream node.

The receiving of the RREQ packet at each mobile node further comprises registering the adjacent node transmitting the RREQ packet as a redundant upstream node when the RREQ packet is received redundantly, and dropping the RREQ packet. Hence, the path fit for QoS information of data to be transmitted is selected by registering the redundant paths and a lost path can be promptly recovered.

The RREQ packet contains a quality of service (QoS) information required for data transferred from the source node.

The selecting of the optimal path at the destination node comprises receiving at least one RREQ packet over a certain standby time, confirming the QoS information and the redundancy degree with respect to the received RREQ packets, respectively, and selecting an optimal path among paths of the RREQ packet transmission depending on the QoS information and the redundancy degree.

The selecting of the optimal path at the destination node may further comprise setting the standby time by checking the QoS information contained in the RREQ packet initially received. Specifically, the redundant paths of the RREQ packets received over a predetermined standby time are checked and the transmission path, of which the number of the redundant paths is most suitable for the QoS information, is selected as the optimal path.

The establishing of the reply route to the source node comprises transmitting the RREP packet from the destination node for the source node along the selected path, registering the node transmitting the RREP packet as a downstream node when a first mobile node on the path receives the RREP packet, and forwarding the RREP packet from the first mobile node to a registered upstream node if the first mobile node is not the source node.

The establishing of the reply route to the source node may further comprise determining, at the first mobile node, whether there is a registered redundant upstream node, and transmitting a redundant route reply (RRR) packet to the redundant upstream node if there is the redundant upstream node.

According to another aspect of the present invention, a lost path in the wireless network environment may be promptly recovered using redundant path information. According to an exemplary embodiment, a method of recovering a lost path comprises detecting disconnection of a second mobile node and a registered downstream node on the path between the source node and the destination node, determining, at the second mobile node, whether there is a redundant path to the downstream node by checking the redundancy degree, and recovering the path between the source node and the destination node using the redundant path when there is the redundant path.

The method of recovering the lost path may further comprise transmitting a failure notification (FN) packet indicating the path loss from the second mobile node to a registered upstream node when it is determined that there is no redundant path, and recovering the lost path at the upstream node using the redundant path when there is the redundant path by checking the redundancy degree.

The method of recovering a lost path may further comprise determining whether the FN packet is transmitted from a node being used when the FN packet is received, and deleting the redundancy degree for a node when the FN packet is transmitted from the node not being used.

According to another aspect of the present invention, there is provided a mobile node establishing a path from a source node to a destination node receiving a message. The mobile node comprises a calculator to calculate a redundancy degree with respect to an adjacent node, a packet receiver to receive a route request (RREQ) packet from the source node, a controller to register an adjacent node transmitting the RREQ packet as an upstream node and append the redundancy degree to the RREQ packet, and a packet transmitter to broadcast for the destination node the RREQ packet containing the appended redundancy degree.

The mobile node may further comprise a storage to register the redundancy degree and information on the registered upstream node.

Upon receiving the RREQ packet, the controller determines whether the RREQ packet having the same packet ID as the received packet is received formerly. If it is confirmed that the RREQ packet is redundantly received, the controller registers the adjacent node transmitting the RREQ packet as a redundant upstream node.

Upon receiving the RREQ packet, the controller confirms whether the receiving node is the destination node. If the controller recognizes that the receiving node is the destination node and does not forward the RREQ packet further when a destination node ID contained in the received RREQ packet and a node ID of the receiving node are compared and are identical with each other.

If it is confirmed that the receiving node is the destination node, the controller selects an optimal path from paths of the RREQ packet transmission by checking a quality of service (QoS) information and the redundancy degree contained in the RREQ packet. The controller controls the packet transmitter to transmit a route reply (RREP) packet to a registered upstream node on the selected optimal path.

If it is confirmed that a node receiving the RREP packet is not the source node, the controller registers a node transmitting a RREP packet as a downstream node and controls the packet transmitter to transmit the RREP packet to a registered upstream node when the RREP packet is received from the destination node.

The controller controls the packet transmitter to transmit a redundant route reply (RRR) packet to a redundant upstream node when there is the registered redundant upstream node.

The controller registers an adjacent node transmitting the RRR packet as a downstream node, appends the redundancy degree to the RRR packet, and controls the packet transmitter to transmit the RRR packet to the upstream node when the RRR packet is received.

According to another aspect of the present invention, there is provided a wireless network system including a mobile node. The wireless network system comprises a source node to broadcast a route request (RREQ) packet for path establishment, at least one mobile node to calculate and store a redundancy degree with respect to an adjacent node, append the redundancy degree to the RREQ packet when the RREQ packet is received, and broadcast the RREQ packet for a destination node, and the destination node to select an optimal path from paths of the RREQ packet transmission by checking the redundancy degree when the RREQ packet is received and transmit a route reply (RREP) packet to the source node along the optimal path.

The mobile node determines whether the RREQ packet is received redundantly, and if not, the mobile node registers an adjacent node transmitting the RREQ packet as an upstream node and broadcasts the RREQ packet for the destination node.

If the RREQ packet is received redundantly, the mobile node registers the adjacent node transmitting the RREQ packet as a redundant upstream node and drops the RREQ packet.

The destination node sets a standby time by checking a quality of service (QoS) information contained in the RREQ packet initially received, and selects as the optimal path from the paths of the RREQ packet transmission within the standby time.

When the RREP packet is received by the mobile node, the mobile node registers an adjacent node transmitting the RREP packet as a downstream node and forwards the RREP packet to a registered upstream node.

The mobile node transmits a redundant route reply (RRR) packet to a redundant upstream node when there is the registered redundant upstream node.

If the mobile node detects a lost path to the downstream node, the mobile node recovers the lost path using a redundant path to the adjacent node by checking the redundancy degree so as to suitably maintain the path in the wireless network system.

The mobile node transmits to the registered upstream node a failure notification (FN) packet indicating the path loss when there is no redundant path.

Accordingly, the source node and destination node select the path providing the QoS and fit for the characteristic of the message to be transmitted, and the lost path is promptly recovered.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawing figures of which.

DETAILED DESCRIPTION OF THE PREFERRED EMBODIMENTS

Figure 1:
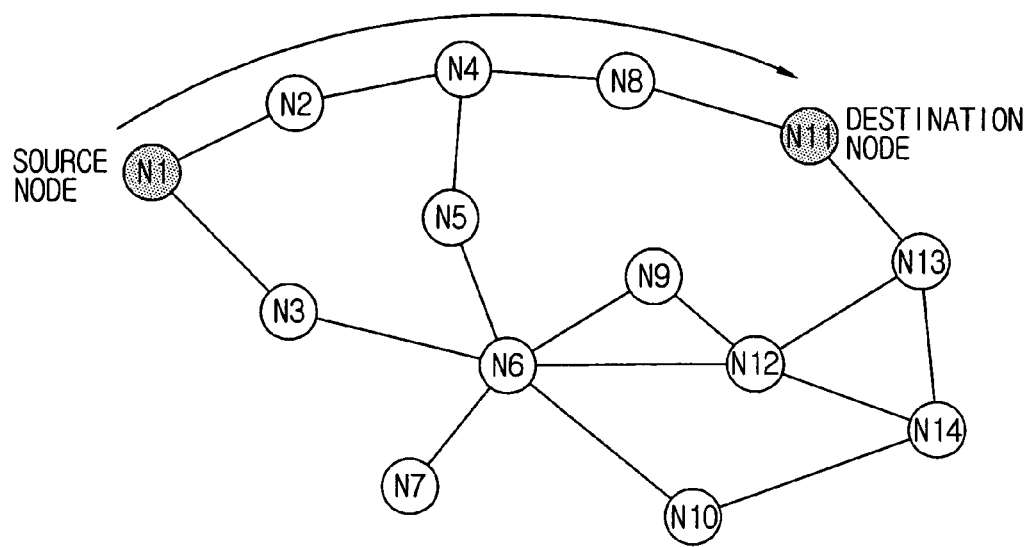
FIG. 1 illustrates path establishment in a conventional wireless network system.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
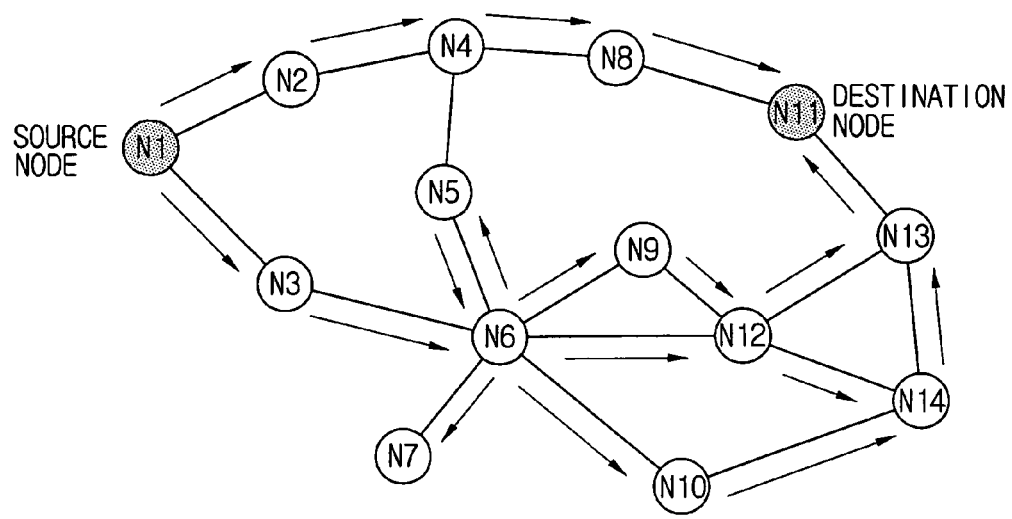
FIGS. 2 to 4 illustrate a wireless network system according to an embodiment of the present invention and a method of establishing a path in the wireless network system.
Figure 3:
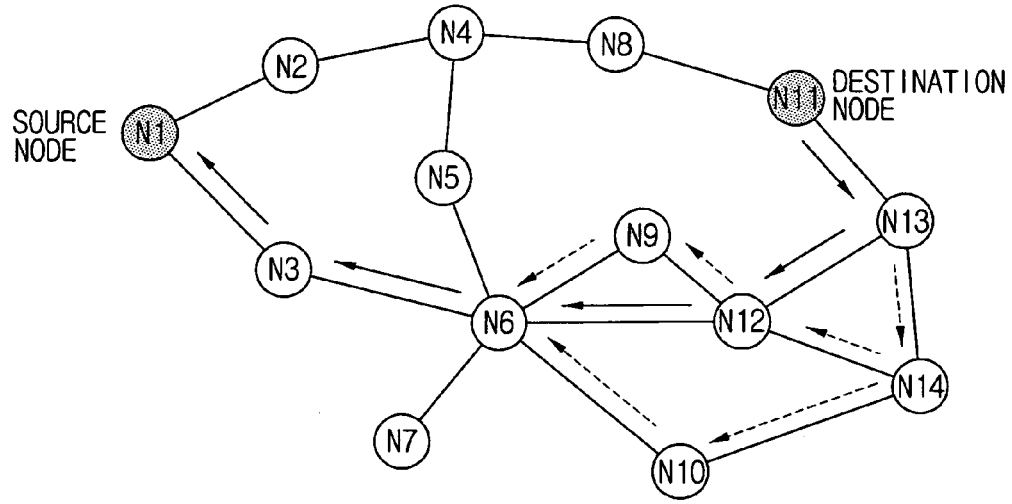
Figure 4:
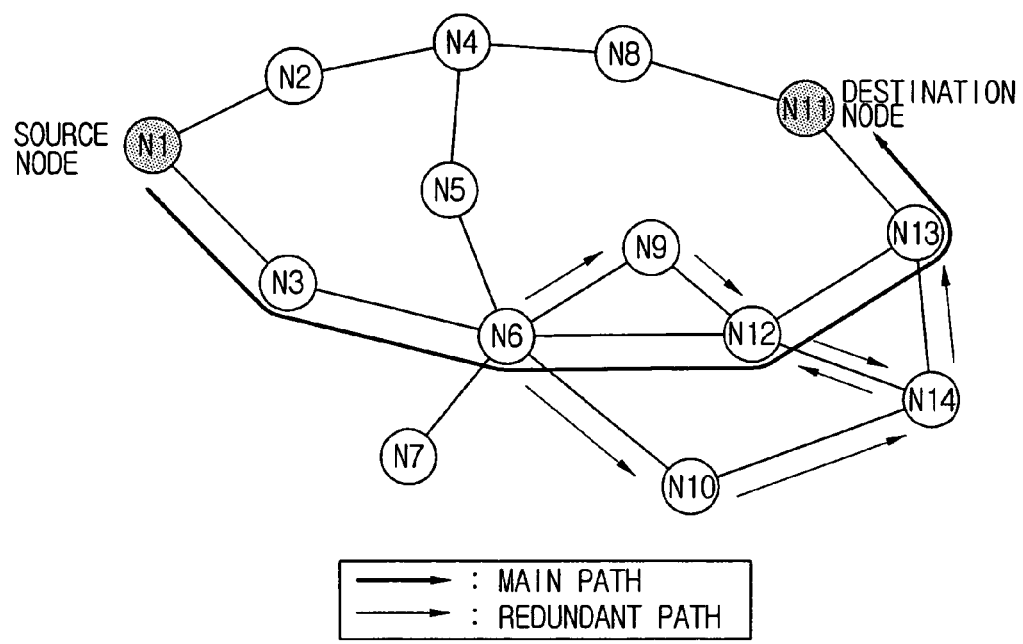

FIGS. 2 through 4 illustrate a wireless network system having a plurality of mobile nodes and a method of establishing a path between a source node N1 and a destination node N11 in the wireless network system.

FIG. 2 illustrates that a route request (RREQ) packet for establishing the path is transmitted from the source node N1 to the destination node N11, and FIG. 3 illustrates a route reply (RREP) packet is transmitted from the destination node N11 in response to the RREQ packet. FIG. 4 illustrates establishing a main path and redundant paths between the source node N1 and the destination node N11.

Referring now to FIG. 2, the source node N1 broadcasts a RREQ packet toward the destination node N11. Adjacent nodes N2 and N3 located between the source node N1 and the destination node N11 respectively receive the broadcast RREQ packet. Each adjacent node N2 and N3 appends to the RREQ packet a redundancy degree calculated in association with neighboring nodes, and broadcasts the RREQ packet for the destination node N11.

The RREQ packet transmitted from the source node N1 contains a packet ID, a source node ID, a destination node ID, a path ID, a quality of service (QoS) information required for data to be transferred, and a redundancy degree of an intermediate node. A mobile node receiving the RREQ packet compares the destination node ID of the received RREQ packet with the node ID of the receiving node, and determines whether the receiving node is the destination node N11. If the destination node ID and the node ID of the mobile node are not identical, the mobile node appends a redundancy degree, calculated with respect to neighbor nodes, to the RREQ packet and registers the node transmitting the RREQ packet as an upstream node.

Still referring to FIG. 2, upon receiving the RREQ packet from the source node N1, each of the nodes N2 and N3 registers the source node N1 as the upstream node, appends a respective redundancy degree, and broadcasts the RREQ packet. Upon receiving the broadcast RREQ packet, each of the nodes N4 and N6 appends a respective redundancy degree, registers the nodes N2 and N3 as upstream nodes, respectively, and broadcasts the RREQ packet for the destination node N11. The RREQ packet broadcast from the node N6 is received at nodes N5, N9, N12, N10 and N7. The node N5 receives another RREQ packet from the node N4 as well, that is, the node N5 redundantly receives the RREQ packet. The node N5 appends its redundancy degree to the first received RREQ packet and forwards the RREQ packet to an adjacent node, while the later received RREQ packet is dropped after registering the node transmitting the later received RREQ packet as a redundant upstream node. Accordingly, if the RREQ packet is first received from the node N4, the RREQ packet received from the node N6 is dropped without further transmission and the node N6 is registered as the redundant upstream node. In like manner, the RREQ packet progresses from the node N4 through a node N8 to the node N11. Also in like manner, the RREQ packet progresses from the node N6 through nodes N9, N10, N12, N14 to N13 and subsequently from the node N13 to the node N11.

When the RREQ packet initially arrives at the destination node N11, the destination node N11 awaits until other RREQ packets are received along other paths over a certain standby time. The standby time may be set by the destination node N11 using the QoS information contained in the initially received RREQ packet. For example, the standby time is shorter for swift communication or longer for stable communication.

The destination node N11 selects an optimal path by checking the redundancy degree contained in each RREQ packet received through several paths. Specifically, the path having the smallest number of the mobile nodes is selected for the swift communication according to the QoS information. In case of the stable communication, the path having the mobile nodes of less mobility is selected even though the path has not a few intermediate nodes. If it is required to swiftly recover a lost path, another path along which intermediate nodes have numerous redundant paths is selected as an optimal path. That is, the optimal path is selected depending on characteristics of the message transmitted between the source node N1 and the destination node N11.

FIG. 3 illustrates the destination node N11 transmitting a route reply (RREP) packet along an optimal path. Referring to FIG. 3, when the optimal path is established, the destination node N11 transmits the RREP packet to an upstream node N13 along the optimal path. As the destination node N11, like the intermediate nodes, registers as the upstream node a node transmitting the RREQ packet, the RREP packet is transmitted via the upstream node N13 of nodes N8 and N13, which is located on the selected optimal path.

A mobile node receiving the RREP packet, registers the node transmitting the RREP packet as a downstream node and forwards the RREP packet to the upstream node. If a redundant upstream node is registered, the mobile node transmits a redundant route reply (RRR) packet to the redundant upstream node. Referring back to FIG. 3, the node N13 registers the node N11 as the downstream node and forwards the RREP packet to the node N12. Since the node N13 registers the node N14 as the redundant upstream node, the RRR packet is forwarded to the node N14 as well.

A mobile node receiving the RRR packet (e.g., the node N14 of FIG. 3) registers the node transmitting the RRR packet as the downstream node, appends to the RRR packet the redundancy degree calculated from the downstream node, and forwards the RRR packet to the upstream node. The RRR packet is dropped like the redundant RREQ packet. Accordingly, the RREP packet arrives at the source node N1, the path is established between the source node N1 and the destination node N11.

A main path and redundant paths established as above are shown in FIG. 4. The source node N1 communicates with the destination node N11 using the main path via the nodes N3, N6, N12 and N13. There is a plurality of the redundant paths between the nodes N6 and N13.

If a link failure between nodes or a power failure of a node arises during the communication along the main path, the upstream node of the failed node detects that it is impossible to deliver a message to the destination node N11 using the existing main path. Then, the upstream node determines whether there is a redundant path by checking the redundancy degree registered in the upstream node. If a redundant path exists, the upstream node recovers the lost path by selecting a shortest redundant path or a redundant path suitable for the data characteristic. For example, in case of a link failure between the node N6 and the node N12 shown in FIG. 4, the node N6 restores the link with the node N12 via the node N9, or, establishes a path to the node N13 via the nodes N10 and N14. If the node N12 has the power failure, the N12 recovers the link to the node N13 via the nodes N10 and N14.

If a failure occurs and the upstream node determines that there is no redundant path, the upstream node transmits a failure notification (FN) packet indicating the lost path to the registered upstream node of the node detecting the failure, i.e., a further upstream node. Upon the receiving the FN packet, the further upstream node checks its registered redundancy degree. If there is a redundant path, the further upstream node recovers the lost path, or if there is no redundant path, the further upstream node transmits the FN packet to another upstream node.

The following descriptions are modes of an operation of the wireless network system in various situations having a path loss according to the present invention. Provided that a node receiving a FN packet and a node generating the FN packet are located on the main path, status information of the failure is registered and the presence of a redundant path is checked. If the node generating the FN packet is on the redundant path currently not being used, information on the redundant path via the node generating the FN packet is deleted. If the node receiving the FN packet is on the redundant path currently being used, a related redundancy degree is removed and the FN packet is forwarded to an upstream node.

Figure 5:
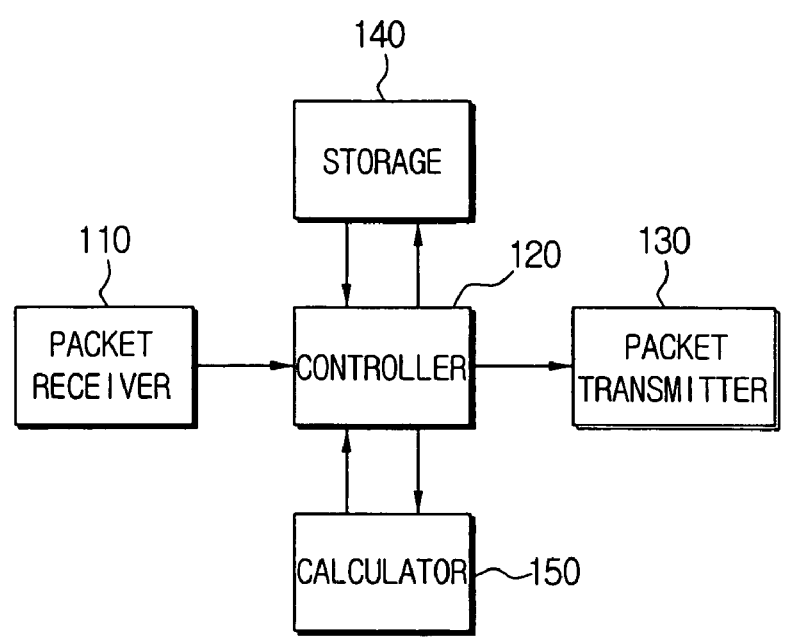
FIG. 5 is a block diagram of a mobile node of the a wireless network system shown in FIGS. 2-4.

FIG. 5 is a block diagram of a mobile node (transceiver) 100 which is typical of the mobile nodes N1 to N14 shown in FIGS. 2 to 4. The mobile node 100 comprises a packet receiver 110, a controller 120, a packet transmitter 130, a storage 140, and an calculator 150.

The packet receiver 110 of mobile node 100 receives a packet from an external source, and the packet transmitter 130 transmits the packet for a destination node. Although the source node and the destination node are so named for convenience of explanation, any of nodes N1-N14 illustrated as examples in FIGS. 2-4 may operate as a source node, a destination none or an intermediate node.

The calculator 150 calculates the redundancy degree at a current location of the mobile node 100. The redundancy degree represents a certain value indicating a probability of a presence of a redundant path between adjacent nodes (any of the source node, the destination mode and other mobile nodes) after checking temporal association, spatial association, and mobility association among a plurality of nodes.

The temporal association between the mobile node and the adjacent node is determined based on Equation 1.

$$T_{data,i}^{e} \leq \min \{T_{link(i,j)}^{e} T_{power,j}^{e}\} \quad (1)$$

In Equation 1, $T_{data,i}^{e}$ indicates a time value required for data transmission from a node i, $T_{link(i,j)}^{e}$ indicates an expected time value of path establishment between nodes i and j, and $T_{power,j}^{e}$ indicates an expected time value until a power failure of the node j. When data is transmitted from the node i to the node j, the time required for the data transmission must be less than or equal to the time of the path establishment or the time until the power failure of the node j in order to successfully transmit the data. Hence, the node j and the node i have the temporal association.

The spatial association is given by Equation 2.

$$j \in R_{comb,i}^{e} \cap R_{\theta,i,j}^{e} \quad (2)$$

In Equation 2, $R_{comb,i}^{e}$ denotes an expected region for relatively stable communication, and $R_{\theta,i,j}^{e}$ denotes a region within ±θ angle based on the node i and the destination node. It is regarded that the node j, which locates within a certain angle to the direction of the destination node among nodes adjoining the expected region for the relatively stable communication with the node i, has the spatial association.

It is necessary to determine the mobile association between the nodes i and j, which are the mobile nodes. The mobility association is determines based on Equation 3.

$$|arccos\{(v_i \cdot v_j)/(|v_i| \cdot |v_j|)\}| \leq \pi/2 \quad (3)$$

In Equation 3, $v_i$ and $v_j$ each indicate a motion vector of the node i and node j. If the angle between $v_i$ and $v_j$ is within 90°, it is considered that the movement direction has association.

The node i determines whether there is an adjacent node satisfying the above Equations 1, 2 and 3, and calculates the redundancy degree based on the determination.

The redundancy degree between the nodes i and j is given by Equation 4.

$$Rd(i,j) = |\{k \in \{Mr(i) \cap Sr(i)\} | T_{link(i,j)}^e \leq T_{link(i,k)}^e\}| \quad (4)$$

In Equation 4, i, j, and k each indicate the mobile node, Rd(i,j) denotes the redundancy degree between the nodes i and j (that is, the number of the redundant paths), Mr(i) indicates an adjacent node having the mobile association with the node i, Sr(i) indicates an adjacent node having the spatial association with the node i, and $T_{link(i,j)}^e$ denotes the expected time value of the path establishment between the node i and the node j. Each node on the path appends to the RREQ packet the redundancy degree calculated from Equation 4, and forwards the RREQ packet for the destination node.

The storage 140 stores the redundancy degree calculated in the calculator 150.

Upon receiving the RREQ packet, the controller 120 determines whether it is the destination node N11 by comparing its node ID with the destination node ID contained in the RREQ packet. If the receiving node is not the destination node, the controller 120 determines whether the RREQ packet was received previously. If the same RREQ packet is redundantly received, the controller registers the node from which the RREQ packet is last received as the redundant upstream node and drops the later received RREQ packet. If the RREQ packet is the first received RREQ packet of redundant packets, the controller 120 registers the node transmitting the first received RREQ packet as the upstream node in the storage 140, appends the redundancy degree of the receiving node to the first received RREQ packet, and broadcasts the first received RREQ packet for the destination node N11 by controlling the packet transmitter 130. It is advantageous to broadcast the RREQ packet to a region within a certain angle to the direction of the destination node N11 since it is unnecessary to broadcast to the direction of the source node.

If the receiving node is the destination node N11, the controller 120 selects an optimal path by checking the redundancy degree contained in the individual RREQ packet based on Equation 5.

$$\text{Redundancy}(p) = \underset{path(p) \in paths(src,dst)}{\text{argmax}} \{\text{Redundancy}(p)\} \sum_{link(i,j) \in path(p)} \{\min\{Rd(i,j), UpperLimit\}\} \quad (5)$$

In Equation 5, Redundancy(p) denotes the redundancy degree of the path p, and argmax is a function for selecting a path having the greatest Redundancy(p) among paths between the source node src and the destination node dst. UpperLimit denotes a maximum value of the redundancy degree, and Rd(i,j) indicates the redundancy degree between the node i and the node j calculated from Equation 4. The controller 120 of the destination node N11 selects as the optimal path the transmission path of the RREQ packet having the greatest redundancy degree and transmits the RREP packet to its registered upstream node.

Upon receiving the RREP packet, the upstream node on the optimal path registers the node transmitting the RREP packet as a downstream node in the storage 140, and forwards the RREP packet to an upstream node registered in the storage 140. If the redundant upstream node is registered in the storage 140, the RRR packet is also transmitted to the redundant upstream node. When the packet receiver 110 confirms the reception of the RRR packet, the controller 120 registers the node transmitting the RRR packet as the downstream node, calculates and appends the redundancy degree with respect to the downstream node to the RRR packet, and forwards the RRR packet to the upstream node.

If the controller 120 detects a disconnection with the adjacent node, the controller 120 determines whether there is the redundant path which may be substituted for the lost path by checking the redundancy degree registered in the storage 140. If so, the controller 120 recovers the lost path using the redundant path. If there is information on a formerly lost path among the redundant paths, the controller 120 uses other paths excluding the formerly lost path.

The mobile node selects an optimal path from the several redundant paths based on the following Equation 6 to thus recover the lost path.

$$Rd_n(p) = \frac{\sum_{link(i,j) \subset p} Rd_r(i,j)}{|p|} \quad (6)$$

In Equation 6, $Rd_r(i,j) = \alpha \times Tr_r(i,j) + \beta \times Mr_r(i,j)$ $$Tr_r(i,j) = \min\left\{\frac{T_{link(i,j)}^e}{T_{data(i)}^e}, 1\right\}, \text{ and}$$

$$Mr_r(i,j) = e^{-|v_{i,j}|} \times I_{mr(i,j)}.$$

In Equation 6, $Rd_r$ denotes the redundancy degree of the redundant path except the main path. That is, the node i detecting the link failure selects an optimal path by calculating the redundancy degree of the redundant path starting from the node i. $Rd_n(p)$ denotes a redundancy degree generalized by diving the redundancy degree of the path p by the total number of links |p| on the path p.

$Mr_r(i,j)$ and $Tr_r(i,j)$ each are functions for calculating a link mobility scale and a temporal association scale between the node i and the node j. $I_{mr(i,j)}$ denotes a mobility scale function, and α and β each denote weight functions with respect to the temporal association and the mobility.

The mobile node may set α and β by confirming and reflecting the QoS information of data to be transferred.

In general, the source node N1 and the destination node N11 transmit and receive diverse data such as video data, audio data, and character data. The transceived data may be sensitive to time delay (for example, real-time transmission data), or, may require more stable transmission at the expense of time (for example, electronic mail). Accordingly, α and β are adaptively determined depending on the characteristic of the system employing the mobile node, that is, depending on the characteristic of the data transceived by the mobile node. When the QoS is left out of consideration, the weight functions α and β are set to '1' respectively. The weight fuction α becomes greater for the stable transmission and the weight function β becomes greater for the sensitivity to the time delay.

If there is no redundancy degree, the controller 120 controls the packet transmitter 130 to transmit the FN packet to its upstream node registered in the storage 140.

Figure 6:
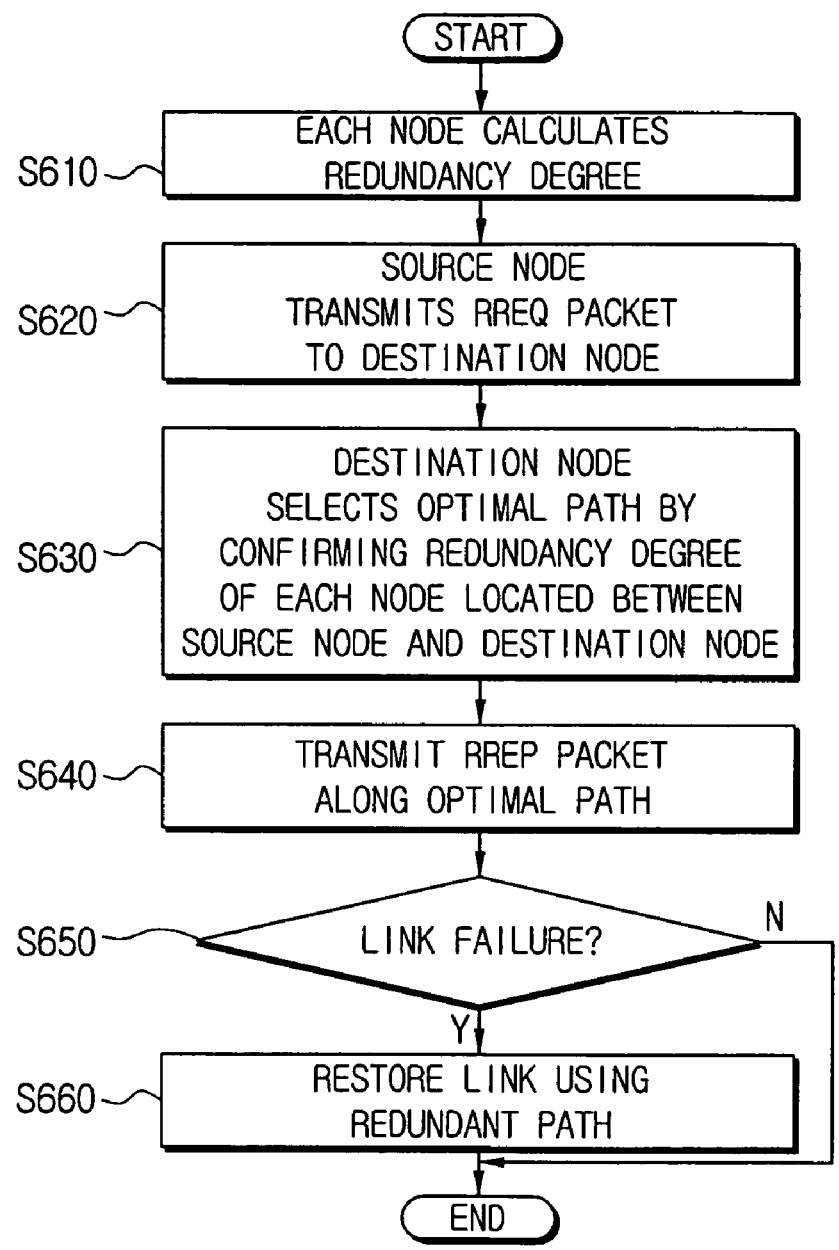
FIG. 6 is a flowchart of operations for establishing and maintaining the path in the wireless network system shown in FIGS. 2-4.

FIG. 6 is a flowchart of the path establishment using the mobile nodes in the wireless network system according to the present invention. Referring to FIG. 6, each mobile node located between the source node N1 and the destination node N11 calculates and stores the redundancy degree in relation with the redundant path with adjacent nodes at operation S610. The redundancy degree is calculated from Equation 4 above.

The source node N1 transmits the RREQ packet for the destination node N11 to establish a path with the destination node N11 at operation S620.

The mobile nodes initially receiving the RREQ packet broadcast from the source node N1, each register the source node N1 as an upstream node, append it's a respective redundancy degree to the RREQ packet, and broadcast the RREQ packet for the destination node N11. Mobile nodes receiving such a RREQ packet each register the node transmitting the RREQ packet as an upstream node, append it's a respective redundancy degree to the RREQ packet, and broadcast the RREQ packet for the destination node N11. If it is determined that the same RREQ packet is received previously by checking the packet ID, each mobile node receiving the same RREQ packet registers the node transmitting the same RREQ packet as an redundant upstream node and drops the received packet. As a result, the RREQ packet arrives at the destination node N11.

The destination node N11 selects an optimal path by confirming the QoS information and the redundancy degree contained in the RREQ packet at operation S630. For example, the destination node N11 selects the path having the smallest number of the mobile nodes for the swift communication, or, selects the path having a greater number of the redundant paths even though also having more of the intermediate nodes for the stable communication.

The destination node N11 transmits the RREP packet along the selected optimal path at operation S640. Upon receiving the RREP packet, each mobile node on the optimal path registers the node transmitting the RREP packet as a downstream node and forwards the RREP packet to its registered upstream node. If there is a redundant upstream node, the RRR packet is transmitted to the redundant upstream node as mentioned above. The optimal path is selected based on Equation 5 above.

When the path is established between the source node N1 and the destination node N11, the source node N1 transfers a message to the destination node N11 along the established path. If a certain mobile node on the established path recognizes that it is impossible to forward the message further to the downstream node, the certain mobile node determines the link failure at operation S650.

Then, the certain mobile node forwards the message using another path by checking the redundancy degree at operation S660. The certain mobile node may select an optimal path from the redundant paths based on Equation 6 above. If the certain mobile node determines that there is no redundant path, the certain mobile node transmits the FN packet to its registered upstream node. Upon receiving the FN packet, the upstream node searches another path using the redundancy degree.

Figure 7:
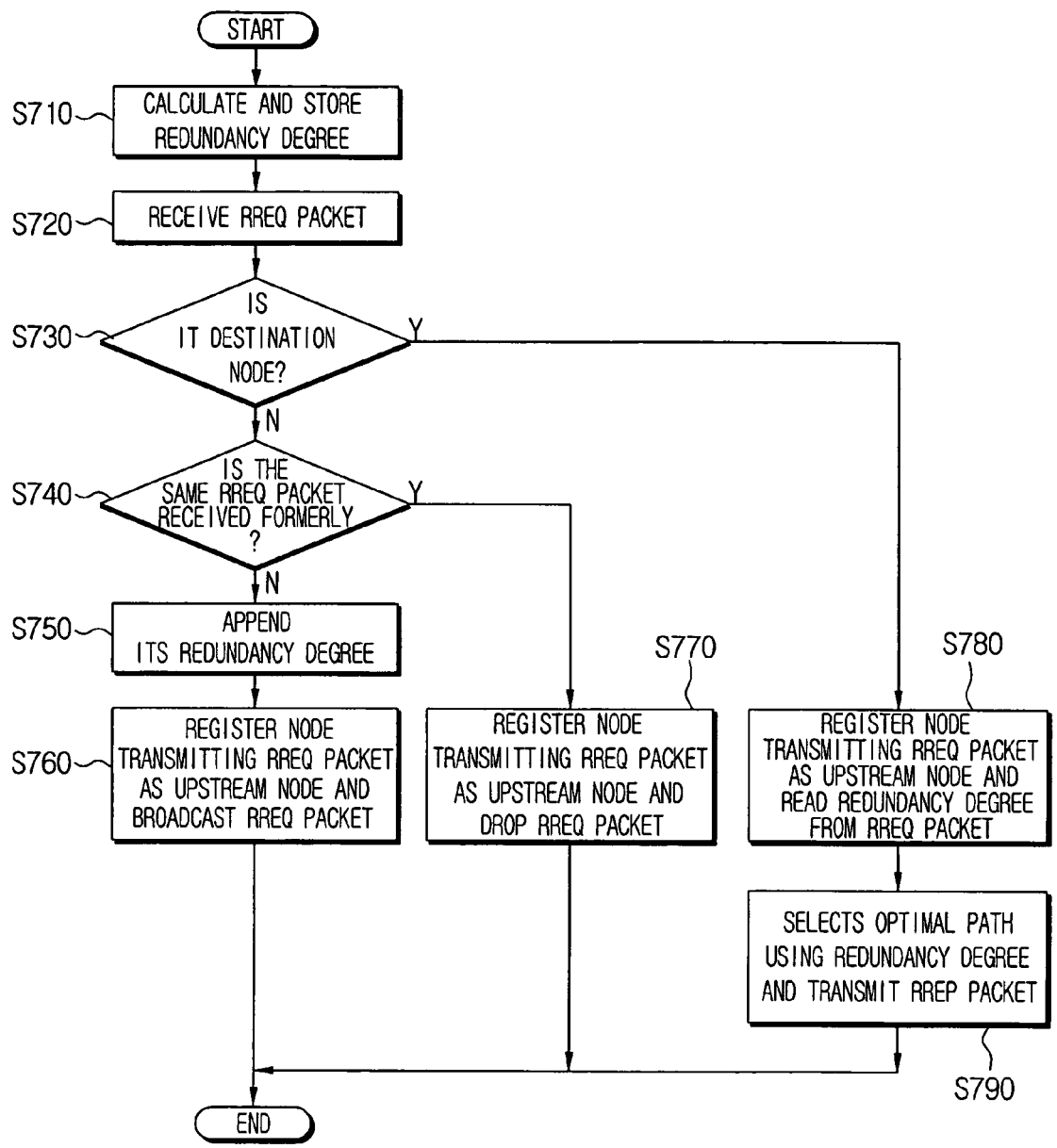
FIG. 7 is a flowchart of operations for processing a route request (RREQ) packet received at a certain mobile node of the wireless network system shown in FIGS. 2-4.
Figure 8:
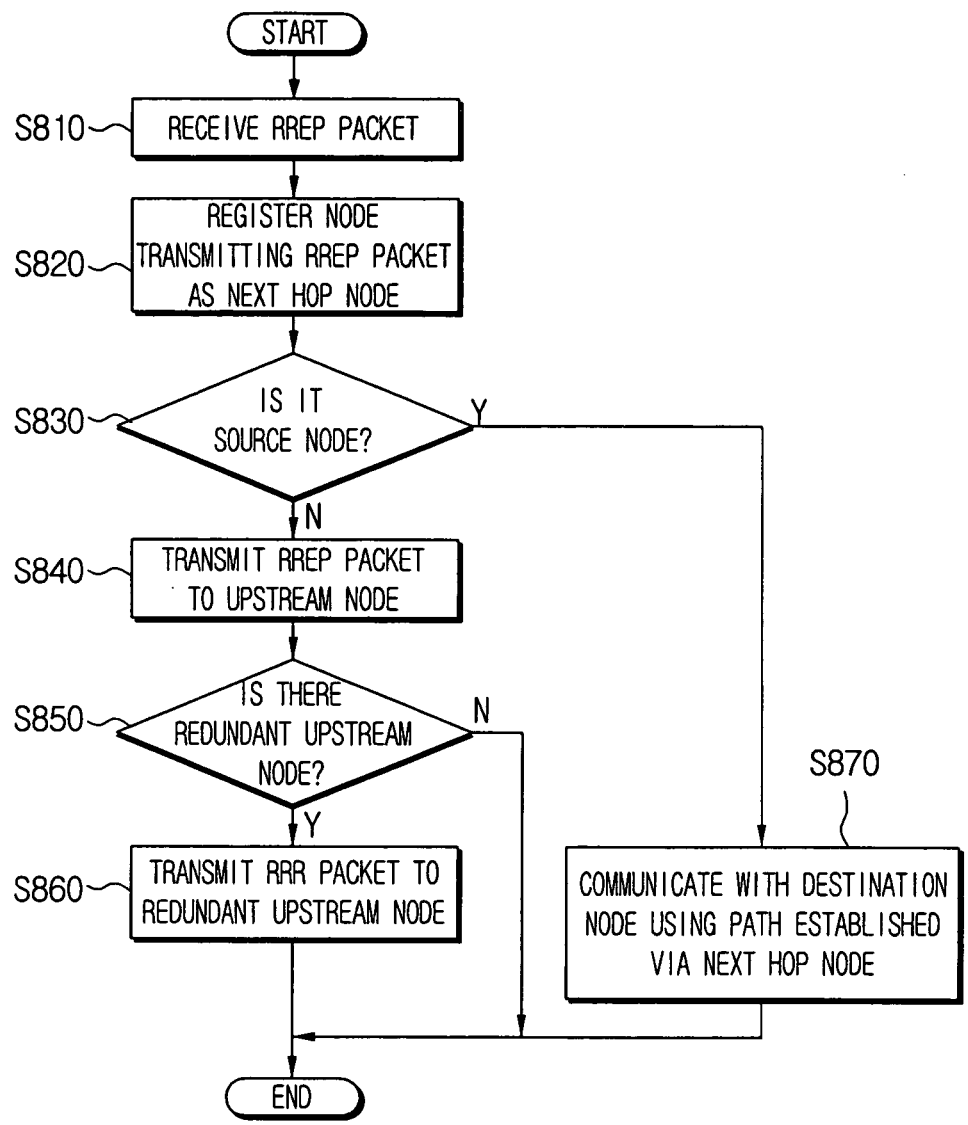
FIG. 8 is a flowchart of operations for processing a route reply (RREP) packet received at a mobile node of the wireless network system shown in FIGS. 2-4.
Figure 9:
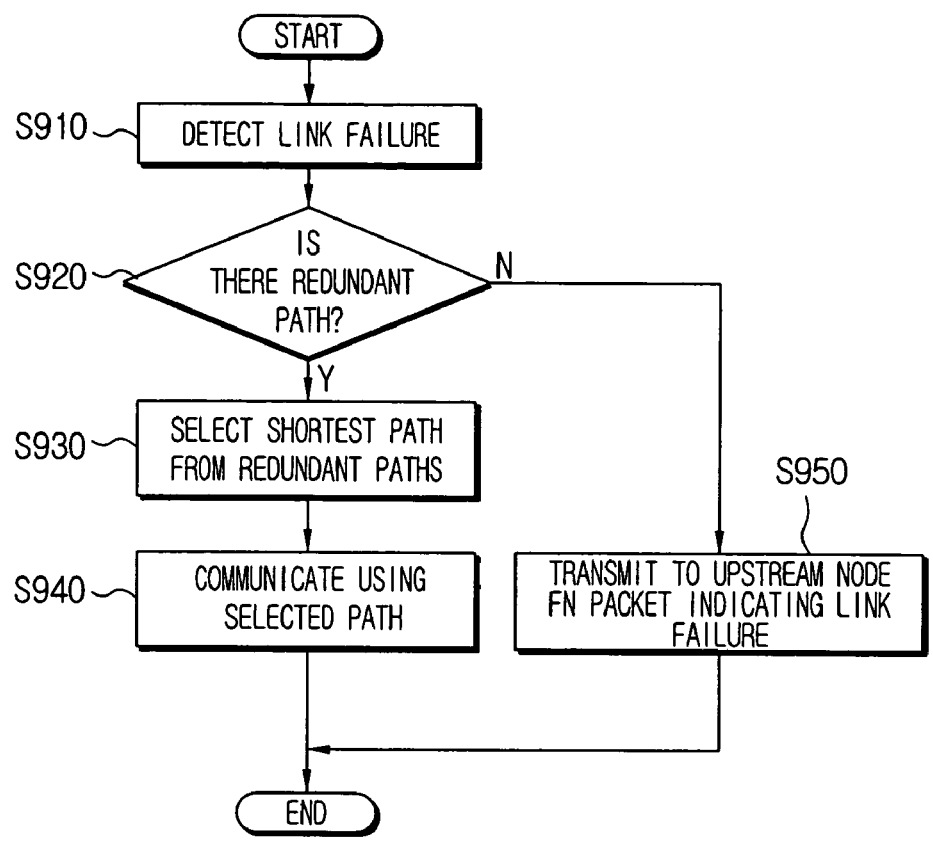
FIG. 9 is a flowchart of processing a path loss in the wireless network system shown in FIGS. 2-4.

FIGS. 7 through 9 are flowcharts for processing the path establishment by the mobile node in the wireless network system according to an exemplary embodiment of the present invention. FIG. 7 illustrates that the mobile node processes the RREQ packet broadcast from the source node N1.

Referring to FIG. 7, the mobile node calculates and stores the redundancy degree with respect to adjacent nodes at operation S710. The redundancy degree is calculated according to Equation 4 above.

Upon receiving the RREQ packet broadcast from the source node N1 at operation S720, the mobile node determines whether the receiving mobile node is the destination node N11 at operation S730. If the destination node ID contained in the RREQ packet and the node ID of the receiving mobile node are compared and identical with each other, the receiving mobile node recognizes that the receiving mobile node is the destination node N11. Then, the receiving mobile node registers the node transmitting the RREQ packet as the receiving mobile node's upstream node and reads the redundancy degree from the received RREQ packet at operation S780.

Then, the mobile node selects the optimal path from at least one path of the RREQ packet by checking the QoS information contained in the RREQ packet at operation S790.

If the receiving mobile node determines that the receiving mobile node is not the destination node N11, the receiving mobile node determines whether the RREQ packet having the same packet ID was received previously at operation S740. Specifically, the redundant reception of the RREQ packet is determined, the mobile node registers the node transmitting the RREQ packet as the redundant upstream node and drops the received RREQ packet at operation S770.

If the receiving mobile node determines that the received RREQ packet is the first reception of the RREQ packet at operation S740, the mobile node appends the redundancy degree of the receiving mobile node to the received RREQ packet at operation S750, registers the node transmitting the RREQ packet as the upstream node of the receiving mobile node, and broadcasts the RREQ packet for the destination node N11 at operation S760.

Each mobile node receiving the RREQ packet appends as respective redundancy degree to the received RREQ packet in the same manner. Consequently, the destination node N11 can select an optical path by checking the different redundancy degrees contained in at least one received RREQ packet.

FIG. 8 illustrates a certain mobile node on an optical path processes a RREP packet when the destination node N11 selects the optical path and transfers the RREP packet along the optical path.

Referring to FIG. 8, when the mobile node receives the RREP packet at operation S810, the receiving mobile node registers a node transmitting the RREP packet as a downstream node or a next hop node at operation S820.

The receiving mobile node determines whether the receiving mobile node is the source node N1 by checking the source node ID contained in the RREP packet at operation S830. If the receiving mobile node is not the source node, the receiving mobile node forwards the RREP packet to the registered upstream node of the receiving mobile node at operation S840.

Then, the receiving mobile node determines whether there is any redundant upstream node at operation S850. If a redundant upstream mode exists, the receiving mobile node transmits the RRR packet to the redundant upstream node at operation S860.

If the receiving mobile node is the source node N1, the receiving mobile node performs communication by delivering a message to the destination node N11 using the path established via the downstream node at operation S870.

FIG. 9 illustrates a link failure on the path established as shown in FIGS. 7 and 8 and a restoration of the path.

Referring to FIG. 9, when the link failure is detected at operation S910, a mobile node determines whether there is any redundant path which may be substituted for the lost path by checking the redundancy degree at operation S920.

If a link failure is detected, the mobile node selects the shortest path or an optimal path suitable for the QoS characteristic, from the discovered redundant paths at operation S930, recovers the lost path using the selected path and resumes the communication at operation S940.

If it is determined that there is no redundant path at operation S920, the mobile node transmits the FN packet to the registered upstream node of the mobile node at operation S950. The upstream node receiving the FN packet reconfirms whether there is any redundant path by checking its redundancy degree.

The present invention is illustrated as a wireless network system including numerous mobile sensors. The mobile sensors transfers data to the destination node by establishing the path via adjacent sensors. The mobile sensor may be constructed in a compact size, having a small power output insufficient for an entire transmission of data between a source node and a destination node. Hence, using the numerous mobile sensors, the transmission path can be established fit for the characteristic of data to be sensed in the sensor network, and a lost path can be promptly recovered.

In light of the foregoing, each mobile node located on the path from the source node and the destination node calculates the redundancy degree in consideration of the temporal association, the spatial association, and the mobility with respect to adjacent nodes. When the RREQ packet is broadcast from the source node, each mobile node appends the calculated redundancy degree and forwards the RREQ packet, thus selecting the optimal path fit for the QoS required for the forwarded data. Even if a certain node or a certain link on the established path is lost, the loss is promptly recovered by using the redundancy degree and substituting the lossy path or the failed link.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of establishing a communication path between nodes in a wireless network system comprising a plurality of nodes, one of which operates as a source node, one or more of which operate as mobile nodes, and another of which operates as a destination node receiving a message from the source node, the method comprising:
   broadcasting a route request (RREQ) packet from the source node for the destination node;
   receiving the RREQ packet at one or more of the mobile nodes, appending a redundancy degree with respect to an adjacent node to the RREQ packet at each mobile node and broadcasting the RREQ packet from each mobile node for the destination node along one or more paths;
   selecting an optimal path at the destination node by checking the redundancy degree contained in the RREQ packet received along each path when the RREQ packet is received along at least one path;
   establishing the communication path to the source node by transmitting a route reply (RREP) packet along the optimal path; and
   calculating the redundancy degree at each mobile node by checking a temporal association, a spatial association, and a mobility with respect to an adjacent node of the respective mobile node.

2. The method of claim 1, wherein the receiving of the RREQ packet at each mobile node comprises:
   determining a redundant reception of the RREQ packet by the mobile node receiving the RREQ packet;
   registering the adjacent node transmitting the RREQ packet as an upstream node when the RREQ packet is not received redundantly; and
   appending the calculated redundancy degree in relation to the registered upstream node to the RREQ packet.

3. The method of claim 2, wherein the receiving of the RREQ packet at each mobile node further comprises:
   registering the adjacent node transmitting the RREQ packet as a redundant upstream node when the RREQ packet is received redundantly; and
   dropping the redundantly received RREQ packet.

4. The method of claim 3, wherein the establishing of the communication path comprises:
   transmitting the RREP packet from the destination node for the source node along the selected path;
   registering the node transmitting the RREP packet as a downstream node when a first mobile node on the selected path receives the RREP packet; and
   forwarding the RREP packet from the first mobile node to a registered upstream node if the first mobile node is not the source node.

5. The method of claim 4, wherein the establishing of the communication path further comprises:
   determining whether there is a registered redundant upstream node relative to the first mobile node; and
   transmitting a redundant route reply (RRR) packet to the redundant upstream node if there is the redundant upstream node.

6. The method of claim 1, further comprising:
   including a quality of service (QoS) information required for data transferred from the source node in the RREQ packet.

7. The method of claim 6, wherein the selecting of the optimal path at the destination node comprises:
   receiving at least one RREQ packet at the destination node over a certain standby time;
   checking the QoS information and the redundancy degree with respect to each received RREQ packet at the destination node; and
   selecting the optimal path among the paths of the RREQ packet transmission based on the QoS information and the redundancy degree in each received RREQ packet.

8. A method of establishing a communication path between nodes in a wireless network system comprising a plurality of nodes, one of which operates as a source node, one or more of which operate as mobile nodes, and another of which operates as a destination node receiving a message from the source node, the method comprising:
   broadcasting a route request (RREQ) packet from the source node for the destination node;
   receiving the RREQ packet at one or more of the mobile nodes, appending a redundancy degree with respect to an adjacent node to the RREQ packet at each mobile node and broadcasting the RREQ packet from each mobile node for the destination node along one or more paths;
   selecting an optimal path at the destination node by checking the redundancy degree contained in the RREQ packet received along each path when the RREQ packet is received along at least one path;
   establishing the communication path to the source node by transmitting a route reply (RREP) packet along the optimal path; and
   including a quality of service (QoS) information required for data transferred from the source node in the RREQ packet, wherein the selecting of the optimal path at the destination node comprises:
  receiving at least one RREQ packet at the destination node over a certain standby time;
  checking the QoS information and the redundancy degree with respect to each received RREQ packet at the destination node;
  selecting the optimal path among the paths of the RREQ packet transmission based on the QoS information and the redundancy degree in each received RREQ packet; and
  setting the standby time by checking the QoS information contained in the RREQ packet first received at the destination node.

9. The method of claim 1, further comprising:
  detecting disconnection of a second mobile node and a registered downstream node on the path between the source node and the destination node;
  determining, at the second mobile node, whether there is a redundant path to the downstream node by checking the redundancy degree of the second mobile node; and
  recovering the path between the source node and the destination node using the redundant path when there is the redundant path.

10. A method of establishing a communication path between nodes in a wireless network system comprising a plurality of nodes, one of which operates as a source node, one or more of which operate as mobile nodes, and another of which operates as a destination node receiving a message from the source node, the method comprising:
  broadcasting a route request (RREQ) packet from the source node for the destination node;
  receiving the RREQ packet at one or more of the mobile nodes, appending a redundancy degree with respect to an adjacent node to the RREQ packet at each mobile node and broadcasting the RREQ packet from each mobile node for the destination node along one or more paths;
  selecting an optimal path at the destination node by checking the redundancy degree contained in the RREQ packet received along each path when the RREQ packet is received along at least one path; and
  establishing the communication path to the source node by transmitting a route reply (RREP) packet along the optimal path;
  detecting disconnection of a second mobile node and a registered downstream node on the path between the source node and the destination node;
  determining, at the second mobile node, whether there is a redundant path to the downstream node by checking the redundancy degree of the second mobile node; and
  recovering the path between the source node and the destination node using the redundant path when there is the redundant path;
  transmitting to a failure notification (FN) packet from the second mobile node to a registered upstream node indicating the path loss when it is determined that there is no redundant path: and
  recovering the lost path at the upstream node using the redundant path when there is the redundant path by checking the redundancy degree,
  wherein the recovering of the lost path at the upstream node comprises:
    selecting an optimal redundant path among redundant paths in accordance with the following equations:

$$Rd_n(p) = \frac{\sum_{link(i,j) \subset p} Rd_r(i, j)}{|p|}$$

$$Rd_r(i, j) = \alpha \times Tr_r(i, j) + \beta \times Mr_r(i, j)$$

$$Tr_r(i, j) = \min\left\{\frac{T^e_{link(i,j)}}{T^e_{data(i)}}, 1\right\}$$

$$Mr_r(i, j) = e^{-|v_{i,j}|} \times I_{mr(i,j)},$$

wherein $Rd_r$ is a redundancy degree of the redundant paths excluding a main path, $|p|$ is a total number of links on the path p, $Rd_n(p)$ is a generalized value of $Rd_r$, $Mr_r(i,j)$ and $Tr_r(i,j)$ respectively are functions for calculating a mobile scale and a temporal association scale of a link between the node i and the node i, $I_{mr(i,j)}$ is a mobile scale function of the nodes i and i, and $\alpha$ and $\beta$ respectively are weight functions for the temporal association and the mobility.

11. The method of claim 10, wherein further comprising:
  determining whether the FN packet is transmitted from a node being used when the FN packet is received; and
  deleting the redundancy degree for a node when the FN packet is transmitted from the node not being used.

12. A method of establishing a communication path between nodes in a wireless network system comprising a plurality of nodes, one of which operates as a source node, one or more of which operate as mobile nodes, and another of which operates as a destination node receiving a message from the source node, the method comprising:
  broadcasting a route request (RREQ) packet from the source node for the destination node;
  receiving the RREQ packet at one or more of the mobile nodes, appending a redundancy degree with respect to an adjacent node to the RREQ packet at each mobile node and broadcasting the RREQ packet from each mobile node for the destination node along one or more paths;
  selecting an optimal path at the destination node by checking the redundancy degree contained in the RREQ packet received along each path when the RREQ packet is received along at least one path; and
  establishing the communication path to the source node by transmitting a route reply (RREP) packet along the optimal path;
  calculating the redundancy degree in accordance with the following equation:

$$Rd(i,j) = |\{k \in \{Mr(i) \cap Sr(i)\} | T_{link(i,j)}^e \le T_{link(i,k)}^e\}|,$$

wherein i, j, and k respectively are the mobile nodes, $Rd(i,j)$ is the redundancy degree between nodes i and j, $Mr(i)$ is an adjacent node moving toward the node i, $Sr(i)$ is an adjacent node having a spatial association with the node i, and $T_{link(i,j)}^e$ is an expected time of the path establishment between the node i and the node j.

13. The method of claim 12, further comprising:
  selecting the optimal path in accordance with the following equations:

$$\text{Redundancy}(p) =$$

-continued $$\operatorname*{argmax}_{path(p) \in paths(src,dst)} \sum_{link(i,j) \in path(p)} \{\min\{Rd(i, j), UpperLimit\}\},$$

wherein Redundancy(p) is a redundancy degree of a path p, argmax is a function for selecting a path having a largest Redundancy(p) among paths between the source node src and the destination node dst, UpperLimit is a maximum value of the redundancy degree, and Rd(i,j) is a redundancy degree between the node i and the node j.

14. A method of establishing a communication path between nodes in a wireless network system comprising a plurality of nodes, one of which operates as a source node, one or more of which operate as mobile nodes, and another of which operates as a destination node receiving a message from the source node, the method comprising:
broadcasting a route request (RREQ) packet from the source node for the destination node;
receiving the RREQ packet at one or more of the mobile nodes, appending a redundancy degree with respect to an adjacent node to the RREQ packet at each mobile node and broadcasting the RREQ packet from each mobile node for the destination node along one or more paths;
selecting an optimal path at the destination node by checking the redundancy degree contained in the RREQ packet received along each path when the RREQ packet is received along at least one path;
establishing the communication path to the source node by transmitting a route reply (RREP) packet along the optimal path;
detecting disconnection of a second mobile node and a registered downstream node on the path between the source node and the destination node;
determining, at the second mobile node, whether there is a redundant path to the downstream node by checking the redundancy degree of the second mobile node;
recovering the path between the source node and the destination node using the redundant path when there is the redundant path;
transmitting to a failure notification (FN) packet from the second mobile node to a registered upstream node indicating the path loss when it is determined that there is no redundant path; and
recovering the lost path at the upstream node using the redundant path when there is the redundant path by checking the redundancy degree,
wherein the recovering of the lost path at the upstream node comprises:
selecting an optimal redundant path among redundant paths in accordance with the following equations:

$$Rd_n(p) = \frac{\sum_{link(i,j) \subset p} Rd_r(i, j)}{|p|}$$

$$Rd_r(i, j) = \alpha \times Tr_r(i, j) + \beta \times Mr_r(i, j)$$

$$Tr_r(i, j) = \min\left(\frac{T^e_{link(i,j)}}{T^i_{data(i)}}, 1\right)$$

$$Mr_r(i, j) = e^{-|v_{i,j}|} \times I_{mr(i,j)},$$

wherein $Rd_r$ is a redundancy degree of the redundant paths excluding a main path, |p| is a total number of links on the path p, $Rd_n(p)$ is a generalized value of $Rd_r$, $Mr_r(i,j)$ and $Tr_r(i,j)$ respectively are functions for calculating a mobile scale and a temporal association scale of a link between the node i and the node j, $I_{mr(i,j)}$ is a mobile scale function of the nodes i and j, and α and β respectively are weight functions for the temporal association and the mobility.

15. A mobile node for establishing a communication path between a source node and a destination node, the mobile node comprising:
a calculator to calculate a redundancy degree for the mobile node with respect to at least one node adjacent to the mobile node;
a packet receiver to receive a route request (RREQ) packet transmitted by the source node or another mobile node;
a controller to register the transmitting node as an upstream node and append the redundancy degree to the RREQ packet;
a packet transmitter to broadcast the RREQ packet having the appended redundancy degree for the destination node; and
a storage to store the redundancy degree and information on the registered upstream node,
wherein the controller registers the transmitting node as a redundant upstream node where the RREQ packet is redundantly received by the mobile node;
the packet receiver receives a route reply (RREP) transmitted by the destination node or yet another node;
the controller registers the node transmitting the (RREP) packet as a downstream node and controls the packet transmitter to transmits the RREP packet to the registered upstream node;
the controller controls the packet transmitter to transmit a redundant route reply (RRR) packet to the redundant upstream node when the redundant upstream node is registered by the mobile node; and
the controller registers the node transmitting the RRR packet as a downstream node, appends the redundancy degree to the RRR packet, and controls the packet transmitter to transmit the RRR packet to the upstream node.

16. The mobile node of claim 15, wherein the controller:
compares a node ID of the mobile node with a destination node ID contained in the received RREQ packet, and
recognizes the mobile node as the destination node if the mobile node ID and the destination node ID are identical.

17. The mobile node of claim 16, wherein:
where the receiving node is recognized as the destination node and the destination node receives the RREQ packet via a plurality of paths, the controller selects an optimal path from among the plurality of paths by checking a quality of service (QoS) information and the redundancy degree contained in the respective RREQ packets.

18. The mobile node of claim 17, wherein:
where the receiving node is the destination node, the packet transmitter transmits a route reply (RREP) packet to a registered upstream node on the selected optimal path.

19. A wireless network system comprising:
a source node to broadcast a route request (RREQ) packet for path establishment;
at least one mobile node to calculate and store a redundancy degree with respect to an adjacent node, append the redundancy degree to the RREQ packet when the RREQ packet is received, and broadcast the RREQ packet; and a destination node to receive the RREQ packet via a plurality of paths and select an optimal path from among the plurality of paths by checking the redundancy degree of the RREQ packet received via at least one of the plurality of paths and to transmit a route reply (RREP) packet to the source node along the optimal path, wherein the mobile node determines whether the RREQ packet is received redundantly, and if the RREQ packet is not redundantly received, the mobile node registers an adjacent node transmitting the RREQ packet as an upstream node and broadcasts the RREQ packet for the destination node;

the mobile node registers the adjacent node transmitting the RREQ packet as a redundant upstream node and drops the RREQ packet when the RREQ packet is received redundantly; and the destination node sets a standby time by checking a quality of service (QoS) information contained in the RREQ packet first received, and selects the optimal path from the paths of the RREQ packet transmission within the standby time.

20. The wireless network system of claim 19, wherein the mobile node registers an adjacent node transmitting the RREP packet as a downstream node and forwards the RREP packet to a registered upstream node.

21. The wireless network system of claim 20, wherein the mobile node transmits a redundant route reply (RRR) packet to a redundant upstream node when there is the registered redundant upstream node.

22. The wireless network system of claim 21, wherein, when the mobile node detects a lost path to the downstream node, the mobile node recovers the lost path using a redundant path to the adjacent node by checking the redundancy degree.

23. The wireless network system of claim 22, wherein the mobile node transmits to the registered upstream node a failure notification (FN) packet indicating the path loss when there is no redundant path.

24. A packet transceiver comprising:
a calculator which calculates a redundancy degree based on a temporal association, a spatial association and a mobility association of the packet transceiver with respect to a node which transmits a route request (RREQ) packet having a packet ID, a destination ID and a quality of service (QoS) information;
a controller which registers the transmitting node as an upstream node, and appends the calculated redundancy degree to the RREQ packet; and
a packet transmitter which transmits the RREQ packet having the appended redundancy degree.

25. The packet transceiver of claim 24, wherein:
if the RREQ packet is received from the transmitting node and another node, the controller registers the node from which the RREQ packet is first received as a primary upstream node, registers a node from which the RREQ packet is later received as a redundant upstream node, and transmits the first received RREQ packet.

26. A packet transceiver, comprising:
a packet receiver which receives one or a plurality of route request (RREQ) packets, each RREQ packet having a packet ID, a destination ID, a quality of service (QoS) information and an appended redundancy degree based on respective temporal, spatial and mobility associations of other packet transceivers which forward the RREQ packets;
a controller which:
checks whether a node ID of the receiving packet transceiver corresponds to the destination ID, and
determines an optimal communication path based on the appended redundancy degree and the QoS information, if the node ID corresponds to the destination ID; and
a packet transmitter which transmits a route reply (RREP) packet on the optimal communication path, If the node ID corresponds to the destination ID.

27. The packet transceiver of claim 26, wherein the controller:
determines the optimum communication path as a path having a smallest number of intermediate nodes where the QoS information indicates a swift communication is required; and
determines the optimum communication path as a path having a greatest number of redundant paths where the QoS information indicates that a stable communication is required.

28. A packet transceiver which operates as one of a plurality of nodes in a wireless system, the packet transceiver comprising:
a storage which stores respective redundancy degrees based on respective temporal associations, spatial associations and mobility associations of the packet transceiver with respect to other nodes which transmits a route request (RREQ) packet having a packet ID and a quality of service (QoS) information via the packet transceiver in route to a destination node; and
a controller which uses the stored redundancy degree to complete a communication path in response to a reply route (RREP) packet transmitted from the destination node toward a source node, wherein, where a main route to one of the other nodes, which main route is specified in the RREP packet based on the QoS information, is lost, the controller selects a redundant route based on the stored redundancy degree.

29. A method of establishing a communication path between a first mobile node operating as a source node and a second mobile node operating as a destination node, the communication path established through one or more mobile nodes operating as intermediate nodes, the method comprising:
forwarding a route request (RREQ) packet from the source node to the destination node via one or a plurality of the intermediate nodes, the RREQ packet having a packet ID and a quality of service (QoS) information;
appending a redundancy degree to the RREQ packet at each intermediate node;
storing information at each intermediate node indicating other nodes from which the RREQ packet is received;
determining an optimal communication path at the destination node based on the respective appended redundancy degrees of the RREQ packets received at the destination node and the QoS information;
transmitting a route reply (RREP) packet identified to the packet ID on the optimal communication path;
determining the optimal communication path as a path having a smallest number of intermediate nodes where the QoS information indicates a swift communication is required; and
determining the optimal communication path as a path having a greatest number of redundant paths where the QoS information indicates that a stable communication is required.

30. A method of establishing a communication path between a first mobile node operating as a source node and a second mobile node operating as a destination node, the communication path established through one or more mobile nodes operating as intermediate nodes, the method comprising:

forwarding a route request (RREQ) packet from the source node to the destination node via one or a plurality of the intermediate nodes, the RREQ packet having a packet ID and a quality of service (QoS) information;

appending a redundancy degree to the RREQ packet at each intermediate node;

storing information at each intermediate node indicating other nodes from which the RREQ packet is received;

determining an optimal communication path at the destination node based on the respective appended redundancy degrees of the RREQ packets received at the destination node and the QoS information;

transmitting a route reply (RREP) packet identified to the racket ID on the optimal communication path; and basing the redundancy degree on respective temporal, spatial and mobility associations of the intermediate nodes which forward the RREQ packet toward the destination node.

31. The method of claim 29, further comprising:

forwarding the RREP from the intermediate nodes toward the source node based on the information stored at each intermediate node identifying the other nodes from which the RREQ packet corresponding to the packet ID was received in route to the destination node.

\* \* \* \* \*

UNITED STATES PATENT AND TRADEMARK OFFICE
CERTIFICATE OF CORRECTION

PATENT NO. : 7,394,776 B2
APPLICATION NO. : 11/035895
DATED : July 1, 2008
INVENTOR(S) : Ji-hoon Lee et al.

It is certified that error appears in the above-identified patent and that said Letters Patent is hereby corrected as shown below:

Column 15, Line 58, change "path:" to --path;--.

Column 16, Line 19, change "i," to --j,--.

Column 16, Line 20, change "i," to --j,--.

Columns 16 and 17, Lines 66 (Col. 16) and 2-5 (Col. 17), change
"
$$\operatorname{Re}dundancy(p) = \arg\max_{path(p) \in paths(src,dst)} \{\operatorname{Re}dundancy(p)\} \sum_{link(i,j) \in path(p)} \{\min\{Rd(i,j), UpperLimit\}\}$$
" to
--
$$\arg\max_{path(p) \in paths(src,dst)} \{\operatorname{Re}dundancy(p)\}$$

$$\operatorname{Re}dundancy(p) = \sum_{link(i,j) \in path(p)} \{\min\{Rd(i,j), UpperLimit\}\}$$
--.

Column 18, Line 33, change "transmits" to --transmit--.

Column 20, Line 6, change "If" to --if--.

UNITED STATES PATENT AND TRADEMARK OFFICE
CERTIFICATE OF CORRECTION

PATENT NO. : 7,394,776 B2
APPLICATION NO. : 11/035895
DATED : July 1, 2008
INVENTOR(S) : Ji-hoon Lee et al.

It is certified that error appears in the above-identified patent and that said Letters Patent is hereby corrected as shown below:

Column 22, Line 2, change "racket" to --packet--.

Signed and Sealed this

Twenty-ninth Day of December, 2009

David J. Kappos
*Director of the United States Patent and Trademark Office*